(12) United States Patent
Cheng et al.

(10) Patent No.: US 12,704,999 B2
(45) Date of Patent: Aug. 11, 2026

(54) COMPLETION QUEUE HANDLING BY HOST CONTROLLER FOR STORAGE DEVICE

(71) Applicant: MediaTek Inc., Hsinchu City (TW)

(72) Inventors: Chin Chin Cheng, Hsinchu City (TW); Chih-Chieh Chou, Hsinchu City (TW); Tzu-Shiun Liu, Hsinchu City (TW)

(73) Assignee: MediaTek Inc., Hsinchu City (TW)

( * ) Notice: Subject to any disclaimer, the term of this patent is extended or adjusted under 35 U.S.C. 154(b) by 260 days.

(21) Appl. No.: 18/323,206

(22) Filed: May 24, 2023

(65) Prior Publication Data

US 2024/0045618 A1 Feb. 8, 2024

Related U.S. Application Data

(60) Provisional application No. 63/370,396, filed on Aug. 4, 2022.

(51) Int. Cl.
*G06F 3/06* (2006.01)

(52) U.S. Cl.
CPC .......... *G06F 3/0659* (2013.01); *G06F 3/0604* (2013.01); *G06F 3/0679* (2013.01)

(58) Field of Classification Search
CPC .... G06F 3/0659; G06F 3/0604; G06F 3/0679; G06F 3/061; G06F 3/0656
See application file for complete search history.

(56) References Cited

U.S. PATENT DOCUMENTS

| | | | | | |
|---|---|---|---|---|---|
| 6,052,744 | A * | 4/2000 | Moriarty | G06F 13/4027 | 710/28 |
| 6,128,669 | A * | 10/2000 | Moriarty | G06F 13/28 | 710/24 |
| 10,740,243 | B1 * | 8/2020 | Benisty | G06F 3/061 | |
| 11,805,081 | B2 * | 10/2023 | Cornett | H04L 69/22 | |
| 11,809,290 | B2 * | 11/2023 | Lee | G06F 3/0604 | |
| 11,861,326 | B1 * | 1/2024 | Singh | G06F 3/061 | |
| 2009/0164726 | A1 * | 6/2009 | Skowronek | G06F 9/383 | 711/E12.024 |
| 2012/0331083 | A1 * | 12/2012 | Li | G06F 13/28 | 709/212 |
| 2016/0117119 | A1 * | 4/2016 | Kim | G06F 13/1642 | 711/103 |
| 2018/0188952 | A1 * | 7/2018 | Carlton | G06F 3/0679 | |
| 2019/0250848 | A1 * | 8/2019 | Benisty | G06F 3/0659 | |
| 2022/0365724 | A1 * | 11/2022 | Chou | G06F 11/07 | |

(Continued)

FOREIGN PATENT DOCUMENTS

JP 4104746 B2 * 6/2008 ............. G06F 13/28

*Primary Examiner* — Michael Alsip
(74) *Attorney, Agent, or Firm* — Tong J. Lee

(57) ABSTRACT

A host system is coupled to a storage device and manages completion queues (CQs) for the storage device. The host system includes a host controller and memory that stores submission queues (SQs) and the CQs. The host controller fetches a command from a given SQ that corresponds to a target CQ. The host controller saves the command in an SQ internal buffer of the host controller, calculates an available capacity (AC) associated with the given SQ for the host system to store a response to the command from the storage device, and sends the command to the storage device when the available capacity is non-zero. The available capacity is calculated based on, at least in part, available slots in the target CQ.

18 Claims, 5 Drawing Sheets

(56) References Cited

U.S. PATENT DOCUMENTS

| | | | | |
|---|---|---|---|---|
| 2023/0073200 | A1* | 3/2023 | Jeong | G06F 3/0679 |
| 2023/0384971 | A1* | 11/2023 | Hahn | G06F 3/0607 |
| 2024/0036729 | A1* | 2/2024 | Uttarwar | G06F 3/064 |
| 2024/0037024 | A1* | 2/2024 | Souda | G06F 12/023 |
| 2024/0045597 | A1* | 2/2024 | Cho | G06F 3/064 |

* cited by examiner

COMPLETION QUEUE HANDLING BY HOST CONTROLLER FOR STORAGE DEVICE

CROSS-REFERENCE TO RELATED APPLICATIONS

This application claims the benefit of U.S. Provisional Application No. 63/370,396 filed on Aug. 4, 2022, the entirety of which is incorporated by reference herein.

TECHNICAL FIELD

Embodiments of the invention relate to a storage device; more specifically, to the management of data transfer between a host and a storage device.

BACKGROUND OF THE INVENTION

An electronic system typically includes a host coupled to a storage device. The host and the storage device are interconnected through an interface such as a Universal Flash Storage (UFS) interface, a Serial Advanced Technology Attachment (SATA) interface, a Small Computer Small Interface (SCSI), a Serial Attached SCSI (SAS), an embedded Multi-Media Card (eMMC) interface, etc.

The UFS interface is primarily for use in mobile systems between a host and a non-volatile memory (NVM) storage device. The host includes a host controller, which is responsible for managing data transfer between host software and a UFS storage device. The host software puts commands into submission queues (SQs) and the host controller moves the commands to an internal buffer. Then the host controller sends a command from the internal buffer to the storage device, where the command is from a given SQ that corresponds to a target completion queue (CQ). When the storage device executes the command and returns a response to the host controller, the host controller sends the response to the target CQ. The host controller also removes the corresponding command entry from its internal buffer. Then the host controller generates an interrupt to the host software to handle the CQ entry.

However, if the target CQ has no available slot for storing the response, a current system may overflow the target CQ or stall the system's operation, causing degradation to the system performance. Thus, there is a need for the current systems to improve queue management without degrading the performance of command execution.

SUMMARY OF THE INVENTION

In one embodiment, a method is provided for a host controller to manage completion queues (CQs) for a storage device. The method includes the step of fetching a command from a given submission queue (SQ) that corresponds to a target CQ. The given SQ and the target CQ are in a memory of a host system coupled to the storage device. The method further includes the steps of saving the command in an SQ internal buffer of the host controller, calculating an available capacity (AC) associated with the given SQ for the host system to store a response to the command from the storage device, and sending the command to the storage device when the available capacity is non-zero. The available capacity is calculated based on, at least in part, available slots in the target CQ.

In another embodiment, a system is provided to manage CQs for a storage device. The system includes one or more processors, a host controller circuit coupled to the one or more processors and the storage device, and host memory to store SQs and the CQs. The host controller circuit is operative to fetch a command from a given SQ that corresponds to a target CQ in the host memory. The host controller circuit is further operative to save the command in an SQ internal buffer of the host controller circuit, calculate an available capacity (AC) associated with the given SQ for the host system to store a response to the command from the storage device, and send the command to the storage device when the available capacity is non-zero. The available capacity is calculated based on, at least in part, available slots in the target CQ.

Other aspects and features will become apparent to those ordinarily skilled in the art upon review of the following description of specific embodiments in conjunction with the accompanying figures.

BRIEF DESCRIPTION OF DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

DETAILED DESCRIPTION OF THE INVENTION

In the following description, numerous specific details are set forth. However, it is understood that embodiments of the invention may be practiced without these specific details. In other instances, well-known circuits, structures, and techniques have not been shown in detail in order not to obscure the understanding of this description. It will be appreciated, however, by one skilled in the art, that the invention may be practiced without such specific details. Those of ordinary skill in the art, with the included descriptions, will be able to implement appropriate functionality without undue experimentation.

Embodiments of the invention provide support for a host controller to manage completion queues (CQs) in a storage system. The storage system includes a storage device and a host system. In one embodiment, the host system uses the host controller to communicate with the storage device according to the Universal Flash Storage (UFS) standard. Although the queue management disclosed herein refers to the UFS standard, it is understood that the queue management may apply to other communication standards between a host system and a storage device.

To prevent the CQs from overflowing, the host controller does not send commands to the storage device when there is no available capacity (AC) in the host system to store the corresponding responses from the storage device. The available capacity refers to the available slots in the CQs and/or the host controller's internal buffers for temporarily storing the responses before the host software processes the responses. In one embodiment, the host controller may fetch a command from a given submission queue (SQ) and hold that command in the host controller's SQ internal buffer until there is an available slot in a corresponding CQ (or a CQ internal buffer) for storing a corresponding response. A number of embodiments are described below.

Figure 1:
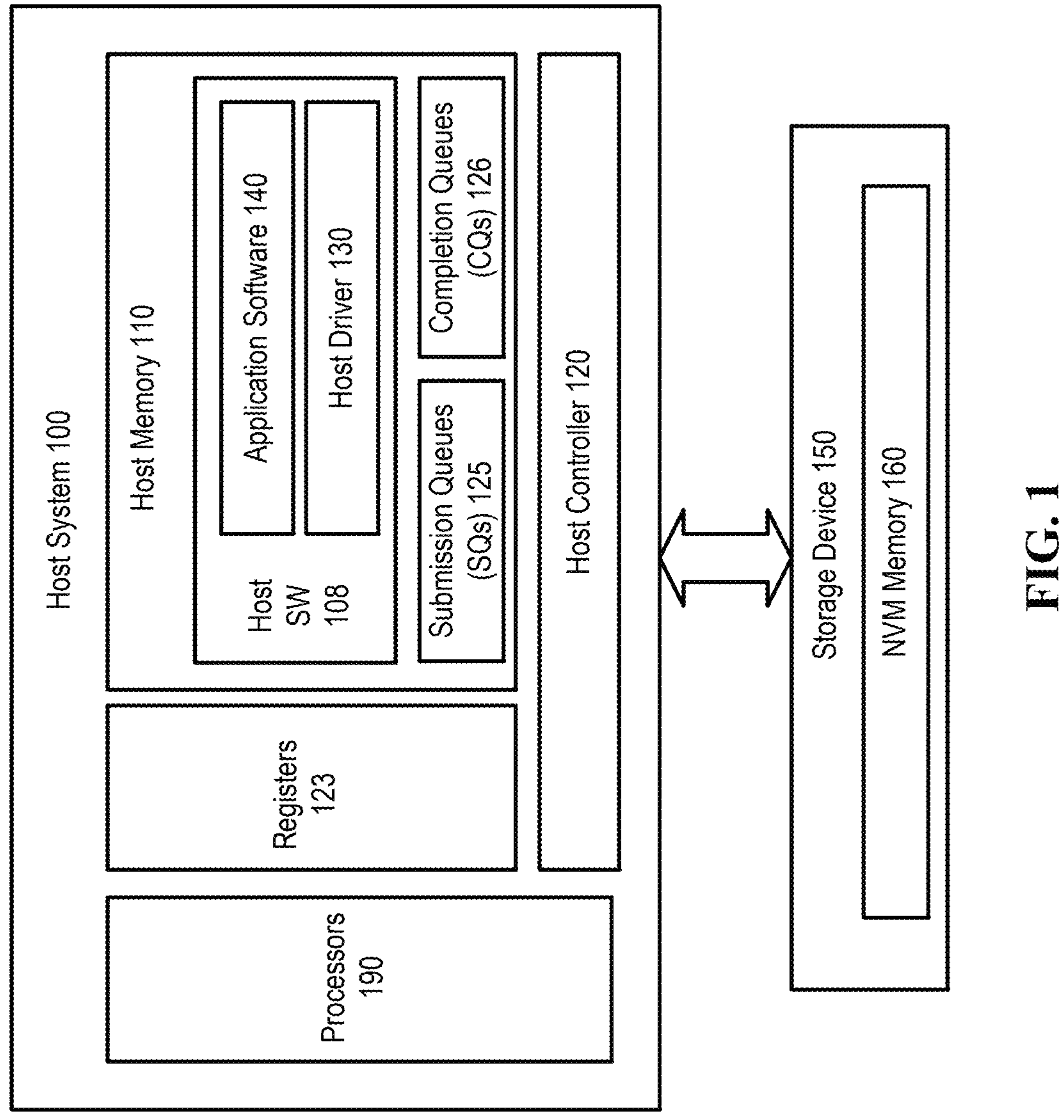
FIG. 1 is a block diagram illustrating a host system coupled to a storage device according to one embodiment.

FIG. 1 is a block diagram illustrating a host system 100 coupled to a storage device 150 (also referred to as a device) according to one embodiment. Host system 100 includes host software 108, which further includes a host driver 130 and application software 140. Host software 108 may be stored in a host memory 110 of host system 100. Host memory 110 may include memory devices such as dynamic random access memory (DRAM), static RAM (SRAM), and/or other volatile and non-volatile memory. Host system 100 also includes one or more processors 190 such as general-purpose processors (e.g., a central processing unit (CPU), a digital signal processor (DSP), a graphics processing unit (GPU), etc.) and/or special-purpose circuits to perform the operations of host software 108. In one embodiment, host system 100 may be a multi-core processing system.

The host system 100 also includes a host controller 120 to manage data transfer between host system 100 and storage device 150. Host controller 120 is also referred to as a host controller circuit. Host controller 120 may be implemented by hardware, or a combination of hardware and software. In one embodiment, host system 100 may be integrated as a system-on-a-chip (SOC). It is understood the embodiment of FIG. 1 is simplified for illustration purposes. Additional hardware components may be included.

Storage device 150 includes storage units such as non-volatile memory (NVM) memory 160. An example of NVM memory is flash memory. In one embodiment, storage device 150 is a UFS device. That is, the exchange of requests, data, and responses between host controller 120 and storage device 150 follows a standard such as the UFS standard. Although UFS is described in the disclosure, it should be understood that the method and system described herein can be applied to other storage system standards.

Referring to host system 100 as "host" and storage device 150 as "device," each UFS command includes three phases: a request phase (from host to device), a data in/out phase (from device to host, or from host to device), and a response phase (from device to host). In this disclosure, when the host fetches and sends a command to the device, it is the request phase of the command that is described.

In one embodiment, host system 100 manages multiple queues in host memory 110. The multiple queues include a set of submission queues (SQs) 125 and a set of completion queues (CQs) 126. Host controller 120 and host driver 130 may communicate via these queues and a set of registers 123. For each SQ 125, host driver 130 is the producer and host controller 120 is the consumer. Host driver 130 uses SQs 125 to submit command descriptors to host controller 120, indicating the commands to be processed by storage device 150. It should be understood that, for ease of description, in this disclosure "submitting a command to an SQ" and "fetching a command from an SQ" are used interchangeably as "submitting a command descriptor to an SQ" and "fetching a command descriptor from the SQ," respectively. A command descriptor identifies a command and points to the instructions of the command stored in host memory 110.

Each SQ 125 identifies a corresponding CQ 126 that will receive its command completion notification. For each CQ 126, host controller 120 is the producer and host driver 130 is the consumer. The host controller 120 uses the CQs 126 to indicate an overall command status (OCS) to the host driver 130. Each CQ entry identifies in which SQ the command originated, the unique identifier for that command, and an OCS field.

For example, host driver 130 can request, on behalf of application software 140, data transfer to storage device 150 by writing a command in the form of a command descriptor to an SQ. Based on queue priorities, host controller 120 chooses an SQ and moves a command from the chosen SQ to an internal buffer. Host controller 120 fetches the commands in the SQ in the order that they are placed into the SQ. After host controller 120 sends the command to storage device 150 and storage device 150 executes the command, storage device 150 notifies host controller 120 of the command completion. Host controller 120 posts the completion information in a CQ corresponding to the originating SQ to inform host driver 130 of the completion of the requested data transfer.

At any given time during the operation, the number of active commands sent from host controller 120 to storage device 150 cannot exceed the maximum number of active commands (referred to as MAC). Host software 108 is operative to set the value of MAC after discovering the queue depth capability of storage device 150.

In some scenarios, host driver 130 may be occupied by other tasks and cannot keep up with the handling of the CQ entries. To prevent CQs from overflowing, host controller 120 may preemptively stop sending commands originating from SQi to storage device 150 when an available capacity indicator of SQi is zero.

Figure 2:
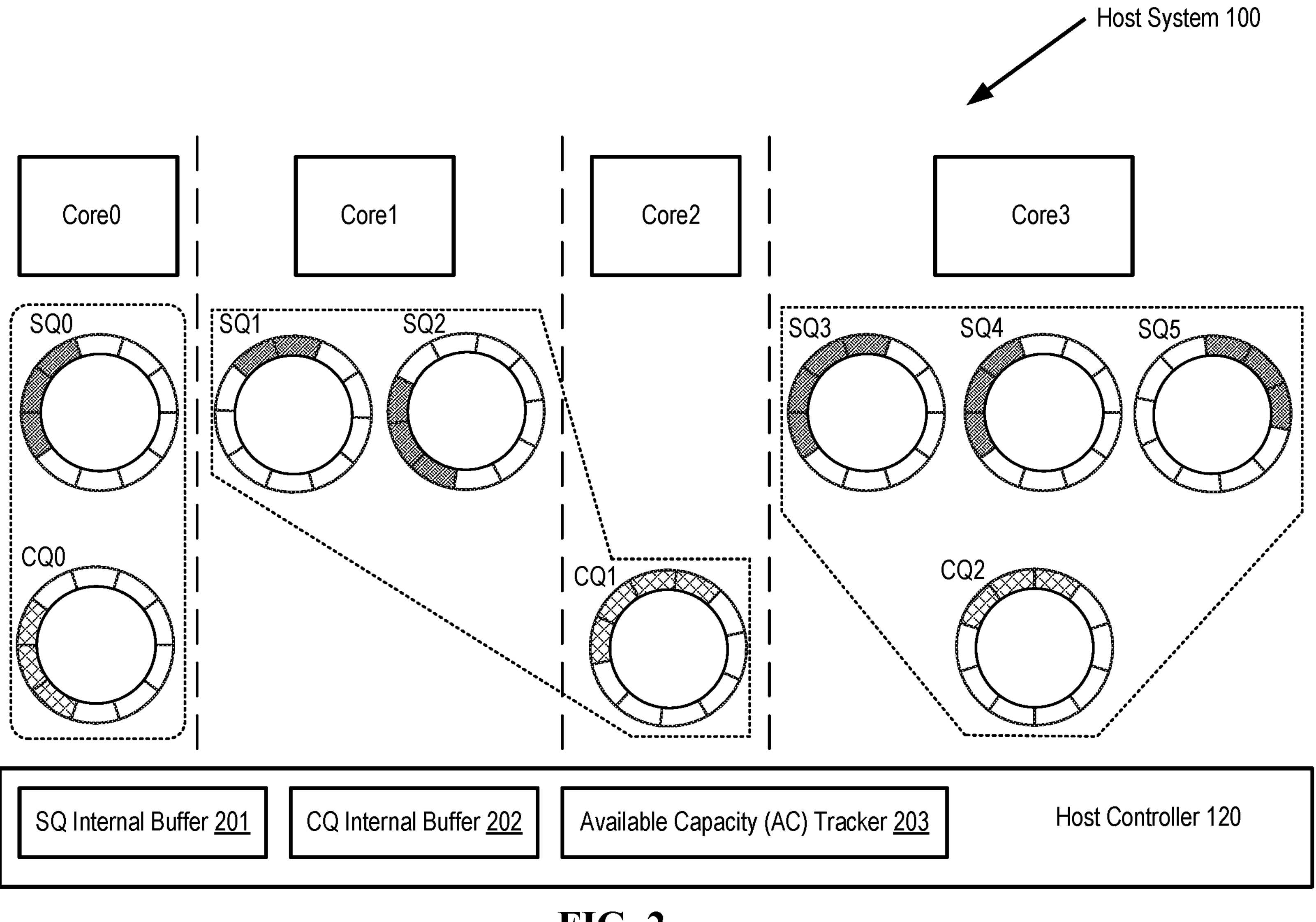
FIG. 2 is a block diagram illustrating further details of the host system according to one embodiment.

FIG. 2 is a block diagram illustrating further details of host system 100 according to one embodiment. Referring also to FIG. 1, in this example, SQs 125 include SQ0-SQ5, CQs 126 include CQ0-CQ2. All of SQ0-SQ5 and CQ0-CQ2 are circular queues and are collectively referred to as multi-circular queues (MCQs). A circular queue uses a head pointer and a tail pointer to keep track of its current content. Queue entries are removed from the head of the queue for processing and new entries are added to the tail of the queue. It is understood that circular queues are a non-limiting example; SQs 125 and CQs 126 can be different types of queues in alternative embodiments.

In this embodiment, host system 100 includes four processor cores (Core0, Core1, Core2, and Core3), and each core manages one or more of the queues (SQs and/or CQs). Each CQ is mapped to one or more corresponding SQs; that is, a response to a command originating from a given SQ will be saved into a corresponding CQ. The CQ and the corresponding SQs may be managed by the same core or different cores.

In one embodiment, host controller 120 includes an SQ internal buffer 201, a CQ internal buffer 202, and an available capacity (AC) tracker 203. Host controller 120 uses SQ internal buffer 201 to temporarily hold the commands fetched from the SQs, and uses CQ internal buffer 202 to temporarily hold the responses from storage device 150. In some embodiments, AC tracker 203 may be implemented by hardware circuits, software, or a combination of software and hardware. AC tracker 203 tracks the available capacity associated with each SQ. The available capacity associated with a given SQ is for storing a response to a command that originates from the given SQ, where the response is sent from storage device 150 to host controller 120. Before a command from a given SQ (e.g., SQi) can be sent to storage device 150, host controller 120 checks whether the available capacity associated with SQi (denoted as AC(SQi)) is non-zero. AC(SQi) is calculated based on, at least in part, the available slots in a target CQ for receiving a response from storage device 150, where the target CQ (e.g., CQj) is corresponding to SQi. The available slots in CQj may be denoted as AS(CQj). That is, AC(SQi) is determined based on, at least in part, AS(CQj). Additional factors for determining AC(SQi) are described with reference to FIG. 3. It is noted that AC(SQi) indicates whether the host system 100 has an available capacity to store a response for the command fetched from SQi. When AC(SQi)=0, host controller 120 stops the command from being sent to storage device 150 by holding the command in SQ internal buffer 201 until AC(SQi)>0.

Figure 3:
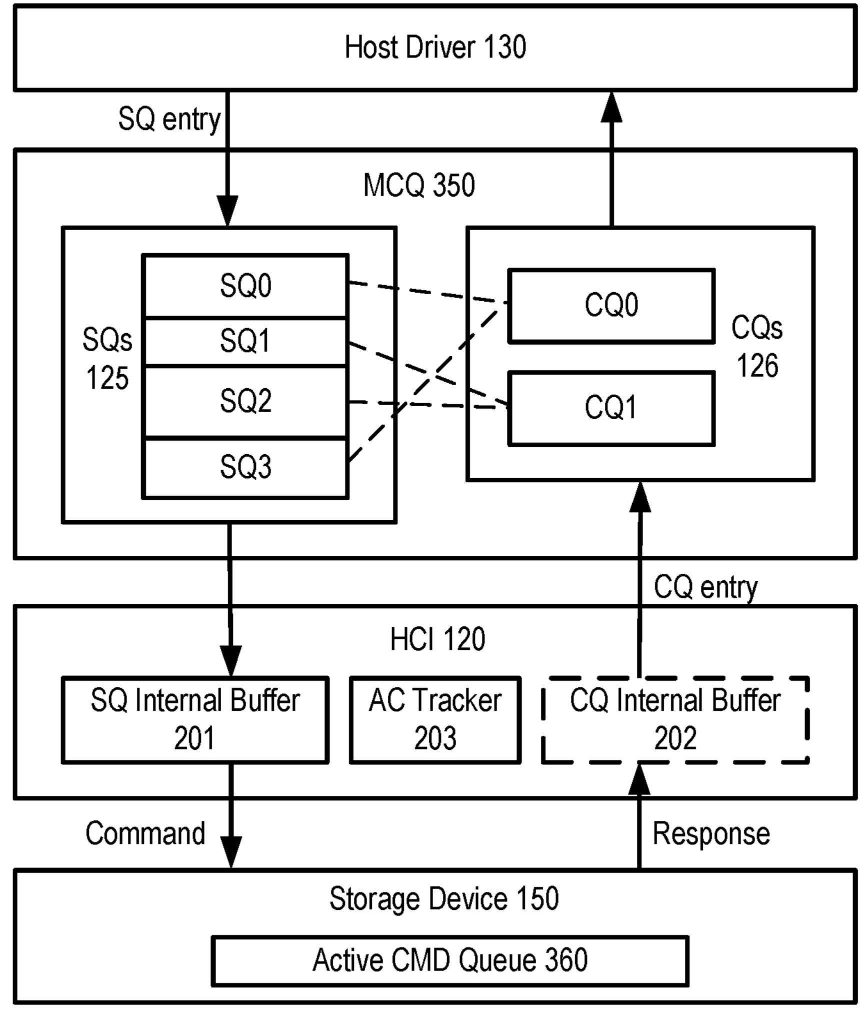
FIG. 3 is a block diagram illustrating queue management according to one embodiment.

FIG. 3 is a block diagram illustrating queue management according to one embodiment. In this example, SQs 125 and CQs 126 are collectively referred to as MCQ 350. FIG. 3 shows an example mapping between SQs 125 and CQs 126: SQ0 and SQ3 map to CQ0, and SQ1 and SQ2 map to CQ1. Host driver 130 may place an SQ entry in any of SQs 125 at the tail end of the queue. Host controller 120 may fetch an SQ entry from any of SQs 125 from the head end of the queue. Supposed that the fetched SQ entry is from SQ3. Host controller 120 temporarily stores the fetched SQ3 entry in SQ internal buffer 201. Storage device 150 includes an active command queue 360 to store active commands, which are commands received from host controller 120 but have not been completed by storage device 150. When the number of active commands in active command queue 360 is within MAC (maximum active commands) and the available capacity AC(SQ3) is non-zero (more specifically, greater than 0), host controller 120 sends the SQ3 entry from SQ internal buffer 201 to storage device 150. Storage device 150 sends a response to host controller 120 when it completes the requested operations according to the command. The response is to be stored in CQ0, which is the CQ mapped to SQ3.

FIG. 3 shows CQ internal buffer 202 in dashed lines to indicate two alternative embodiments. In the first embodiment, host controller 120 includes CQ internal buffer 202; in a second embodiment, host controller 120 does not include CQ internal buffer 202. In the first embodiment, when host controller 120 receives the response from storage device 150, host controller 120 temporarily stores the response into CQ internal buffer 202. Host controller 120 updates CQ0 with the response from storage device 150 to indicate the command completion. Host controller 120 places the response at the tail end of CQ0 and updates the tail pointer of CQ0 to point to that response. In the second embodiment where host controller does not include CQ internal buffer 202, host controller 120 updates CQ0 with the response from storage device 150 without first temporarily storing it in CQ internal buffer 202.

In one embodiment, each SQ has a corresponding threshold (THi). The threshold is an upper limit on the number of slots in a target CQ and CQ internal buffer 202 that responses to commands originating from a given SQ can occupy. In an embodiment where host controller 120 does not include CQ internal buffer 202, the number of slots in CQ internal buffer 202 is set to zero. For example, SQ3 cannot occupy more than TH3 slots in CQ0 and CQ internal buffer 202. Supposed that SQi is mapped to CQj, and the threshold for SQi is THi. For SQi, the available capacity AC(SQi) is the minimum of (1) the number of available slots in CQIB (i.e., CQ internal buffer 202) plus the number of available slots CQj, and (2) the difference between THi and the number of slots in CQj and CQIB that are occupied by responses to commands originating from SQi. When the number of active commands=MAC or AC(SQi)=0, host controller 120 stops sending commands from SQi to storage device 150. In one embodiment, AC tracker 203 tracks the changes in available slots in CQ internal buffer 202 and the CQs. AC tracker 203 updates the available capacities associated with respective SQs when there is a change to the number of available slots or occupied slots in CQ internal buffer 202 and CQs.

Figure 4:
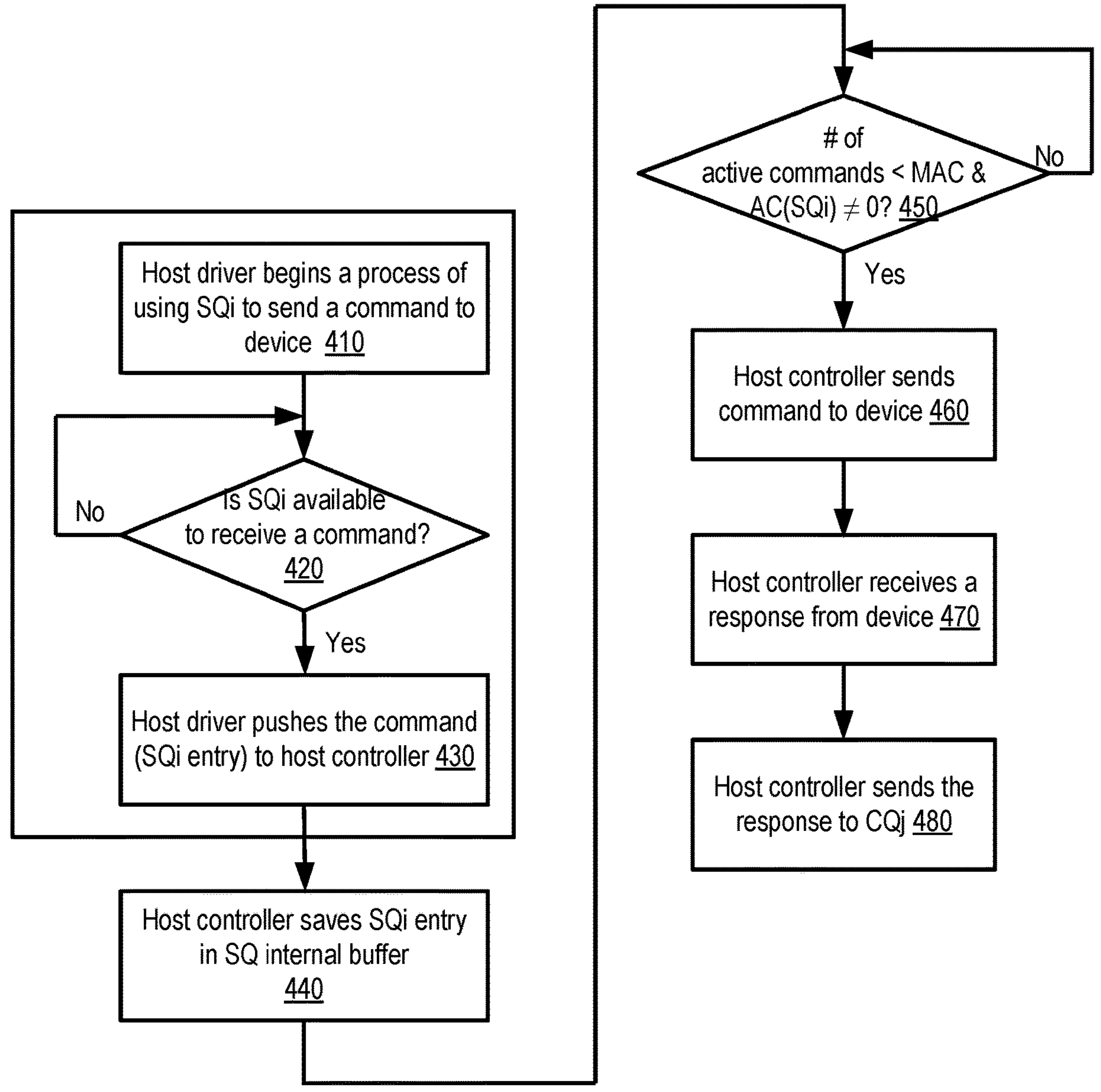
FIG. 4 is a flow diagram illustrating a process of queue management according to one embodiment.

FIG. 4 is a flow diagram illustrating a process of queue management according to one embodiment. This embodiment shows the management of a given SQ (e.g., SQi) and its corresponding CQ (e.g., CQj). It is understood that the same process applies to all SQs in a host system and their corresponding CQs. Referring also to FIG. 1-FIG. 3, host driver 130 at step 410 begins a process of using SQi to send a command to storage device 150 (referred to as device in FIG. 4). If, at step 420, it is determined that SQi is available to receive a command (e.g., SQi is not full), host driver 130 at step 430 pushes the command to host controller 120 by adding the command to SQi as an SQi entry. At step 440, host controller 120 fetches the SQi entry from SQi and saves it in SQ internal buffer 201. To send the SQi entry to storage device 150, host controller 120 determines, at step 450, (1) whether the number of active commands in active command queue 360 is within MAC and (2) whether the available capacity of SQi (i.e. AC(SQi)) is non-zero. If either condition is not satisfied (indicated by No), host controller 120 holds the SQi entry in SQ internal buffer 201 until both conditions are satisfied. When both conditions are satisfied (indicated by Yes), host controller 120 sends the command (i.e., the SQi entry) to storage device 150 at step 460. After storage device 150 completes the command, host controller 120 at step 470 receives a response from storage device 150 indicating the command completion, and sends the response to CQj at step 480.

Figure 5:
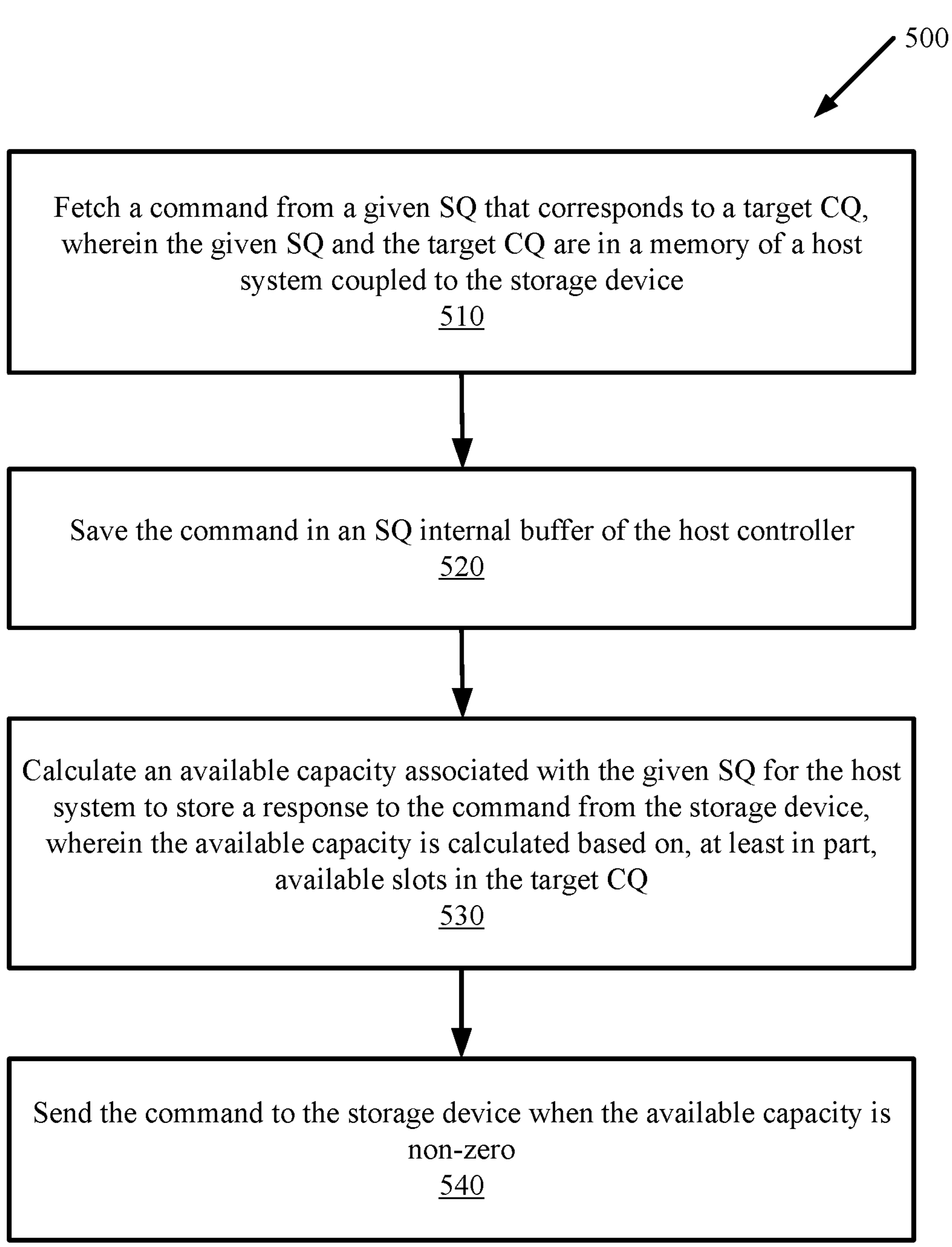
FIG. 5 is a flow diagram illustrating a method for managing completion queues by a host controller for a storage device according to one embodiment.

FIG. 5 is a flow diagram illustrating a method 500 for managing completion queues by a host controller for a storage device according to one embodiment. Method 500 may be performed by host controller 120 in FIG. 1. However, it should be understood that the operations of method 500 can be performed by alternative embodiments, and the embodiment of FIG. 1 can perform operations different from those of method 500.

Method 500 starts with step 510 when a host controller fetches a command from a given SQ that corresponds to a target CQ. The given SQ and the target CQ are in a memory of a host system coupled to a storage device. The host controller at step 520 saves the command in an SQ internal buffer of the host controller. At step 530, the host controller calculates an available capacity associated with the given SQ for the host system to store a response to the command from the storage device. The available capacity is calculated based on, at least in part, available slots in the target CQ. At step 540, the host controller sends the command to the storage device when the available capacity is non-zero.

In one embodiment, the available capacity is calculated based on, at least in part, the difference between a given threshold for the given SQ and the number of slots in the target CQ that are occupied by responses to commands originating from the given SQ. In one embodiment, the available capacity is the minimum of the available slots in the target CQ and the difference.

In another embodiment, the available capacity is calculated based on, at least in part, available slots in a CQ internal buffer of the host controller for buffering responses from the storage device. In one embodiment, the available capacity is the minimum of (1) the available slots in the CQ internal buffer plus the available slots in the target CQ, and (2) the difference between a given threshold for the given SQ and the number of slots in the target CQ and the CQ internal buffer that are occupied by commands originating from the given SQ. The CQ internal buffer may be commonly shared by all of the CQs in the host system. Alternatively, the host system may include a plurality of CQ internal buffers for respective ones of the CQs.

In one embodiment, the host controller sends the command when the number of active commands in an active command queue of the storage device is within a predetermined maximum value. In one embodiment, the host controller stops the command from the given SQ from being sent to the storage device when there is zero available capacity in the host system to store the response.

In one embodiment, the host controller communicates with the storage device according to a Universal Flash Storage (UFS) standard.

While the flow diagram of FIG. 5 shows a particular order of operations performed by certain embodiments of the invention, it should be understood that such order is exemplary (e.g., alternative embodiments may perform the operations in a different order, combine certain operations, overlap certain operations, etc.).

Various functional components or blocks have been described herein. As will be appreciated by persons skilled in the art, the functional blocks will preferably be implemented through circuits (either dedicated circuits or general-purpose circuits, which operate under the control of one or more processors and coded instructions), which will typically comprise transistors that are configured in such a way as to control the operation of the circuitry in accordance with the functions and operations described herein.

While the invention has been described in terms of several embodiments, those skilled in the art will recognize that the invention is not limited to the embodiments described, and can be practiced with modification and alteration within the spirit and scope of the appended claims. The description is thus to be regarded as illustrative instead of limiting.

What is claimed is:

1. A method performed by a host controller in a host system to manage completion queues (CQs) for a storage device coupled to the host system, comprising:

fetching a command from a given submission queue (SQ) that corresponds to a target CQ, wherein the given SQ and the target CQ are in a memory of the host system;

saving the command in an SQ internal buffer of the host controller;

calculating, by the host controller in the host system before sending the command to the storage device for execution, an available capacity (AC) associated with the given SQ in the host system to store a response to the command from the storage device, wherein the available capacity is calculated based on, at least in part, available slots in the target CQ, and wherein the available capacity is calculated based on, at least in part, available slots in a CQ internal buffer of the host controller for buffering responses from the storage device; and sending the command to the storage device for execution when the available capacity associated with the given SQ is non-zero.

2. The method of claim 1, wherein the available capacity is calculated based on, at least in part, a difference between a given threshold for the given SQ and the number of slots in the target CQ that are occupied by responses to commands originating from the given SQ.

3. The method of claim 2, wherein the available capacity is the minimum of the available slots in the target CQ and the difference.

4. The method of claim 1, wherein the available capacity is the minimum of (1) the available slots in the CQ internal buffer plus the available slots in the target CQ, and (2) a difference between a given threshold (TH) for the given SQ and the number of slots in the target CQ and the CQ internal buffer that are occupied by commands originating from the given SQ.

5. The method of claim 1, wherein the CQ internal buffer is commonly shared by all of the CQs in the host system.

6. The method of claim 1, wherein the host system includes a plurality of CQ internal buffers for respective ones of the CQs.

7. The method of claim 1, wherein sending the command further comprises:

sending the command when the number of active commands in an active command queue of the storage device is within a predetermined maximum value.

8. The method of claim 1, further comprising:

stopping the command from the given SQ from being sent to the storage device when there is zero available capacity in the host system to store the response.

9. The method of claim 1, wherein the host controller communicates with the storage device according to a Universal Flash Storage (UFS) standard.

10. A system operative to manage completion queues (CQs) for a storage device, comprising:

the storage device; and a host system coupled to the storage device, the host system further comprising:

one or more processors;

a host controller circuit coupled to the one or more processors; and host memory to store submission queues (SQs) and the CQs, wherein the host controller circuit is operative to:

fetch a command from a given SQ that corresponds to a target CQ in the host memory;

save the command in an SQ internal buffer of the host controller circuit;

calculate, before sending the command to the storage device for execution, an available capacity (AC) associated with the given SQ in the host system to store a response to the command from the storage device, wherein the available capacity is calculated based on, at least in part, available slots in the target CQ, and wherein the available capacity is calculated based on, at least in part, available slots in a CQ internal buffer of the host controller for buffering responses from the storage device; and send the command to the storage device for execution when the available capacity associated with the given SQ is non-zero.

11. The system of claim 10, wherein the available capacity is calculated based on, at least in part, a difference between a given threshold for the given SQ and the number of slots in the target CQ that are occupied by responses to commands originating from the given SQ.

12. The system of claim 11, wherein the available capacity is the minimum of the available slots in the target CQ and the difference.

13. The system of claim 10, wherein the available capacity is the minimum of (1) the available slots in the CQ internal buffer plus the available slots in the target CQ, and (2) a difference between a given threshold (TH) for the given SQ and the number of slots in the target CQ and the CQ internal buffer that are occupied by commands originating from the given SQ.

14. The system of claim 10, wherein the CQ internal buffer is commonly shared by all of the CQs in the host system.

15. The system of claim 10, wherein the host system includes a plurality of CQ internal buffers for respective ones of the CQs.

16. The system of claim 10, wherein the host controller circuit is further operative to:

send the command when the number of active commands in an active command queue of the storage device is within a predetermined maximum value.

17. The system of claim 10, wherein the host controller circuit is further operative to:

stop the command from the given SQ from being sent to the storage device when there is zero available capacity in the host system to store the response.

18. The system of claim 10, wherein the host controller circuit communicates with the storage device according to a Universal Flash Storage (UFS) standard.

* * * * *